(12) United States Patent (10) Patent No.: US 8,583,944 B1
Trimberger (45) Date of Patent: Nov. 12, 2013

(54) METHOD AND INTEGRATED CIRCUIT FOR SECURE ENCRYPTION AND DECRYPTION

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 401 days.

(21) Appl. No.: 12/850,580

(22) Filed: Aug. 4, 2010

(51) Int. Cl.
*G06F 11/30* (2006.01)
*G06F 12/14* (2006.01)
*G06F 1/00* (2006.01)
*H04K 1/00* (2006.01)
*H04L 9/00* (2006.01)

(52) U.S. Cl.
USPC .............. 713/194; 713/193; 713/340; 380/29

(58) Field of Classification Search
None
See application file for complete search history.

(56) References Cited

U.S. PATENT DOCUMENTS

| | | | |
|---|---|---|---|
| 5,598,424 A | 1/1997 | Erickson et al. | |
| 6,181,164 B1 | 1/2001 | Miller | |
| 6,188,766 B1 | 2/2001 | Kocher | |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,346,825 B1 | 2/2002 | Pang et al. | |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,640,305 B2 | 10/2003 | Kocher et al. | |
| 6,654,884 B2 | 11/2003 | Jaffe et al. | |
| 6,766,455 B1 * | 7/2004 | Ryan, Jr. ....................... 713/189 | |
| 6,839,847 B1 * | 1/2005 | Ohki et al. .................... 713/194 | |
| 6,978,370 B1 | 12/2005 | Kocher | |
| 7,039,816 B2 | 5/2006 | Kocher et al. | |
| 7,500,112 B1 * | 3/2009 | Wille et al. .................... 713/194 |
| 7,506,165 B2 | 3/2009 | Kocher et al. | |
| 7,587,044 B2 | 9/2009 | Kocher et al. | |
| 7,599,488 B2 | 10/2009 | Kocher et al. | |
| 7,634,083 B2 | 12/2009 | Kocher et al. | |
| 7,668,310 B2 | 2/2010 | Kocher et al. | |
| 7,675,313 B1 * | 3/2010 | Tang et al. ........................ 326/8 |
| 7,787,620 B2 | 8/2010 | Kocher et al. | |
| 7,792,287 B2 | 9/2010 | Kocher et al. | |
| 2001/0002486 A1 | 5/2001 | Kocher et al. | |

(Continued)

OTHER PUBLICATIONS

Chari, S., et al. "Towards Sound Approaches to Counteract Power-Analysis Attacks", Michael Wiener (ED.): CRYPTO'99, LNCS 1666, Aug. 15-19, 1999, pp. 398-412, Santa Barbara, CA, USA.

(Continued)

*Primary Examiner* — Philip Chea
*Assistant Examiner* — Trong Nguyen
(74) *Attorney, Agent, or Firm* — LeRoy D. Maunu (57) ABSTRACT

In one embodiment, a circuit arrangement for performing cryptographic operations is provided. The circuit includes a substitution block, a cryptographic circuit coupled to the substitution block, and a balancing circuit coupled to the substitution block. The substitution block includes a memory unit storing substitution values and ones-complement values that are corresponding ones-complements of the substitution values. The substitution block, responsive to a request to read a specified one of the substitution values, concurrently reads and outputs the specified substitution value and the corresponding ones-complement value. A power consumed in reading the specified substitution value is uniform with a power consumed in reading another one of the substitution values. The cryptographic circuit and the balancing circuit are configured to concurrently operate on each substitution value and the corresponding ones-complement value read from the memory, respectively.

19 Claims, 6 Drawing Sheets

(56) References Cited

U.S. PATENT DOCUMENTS

| | | |
|---|---|---|
| 2001/0053220 A1 | 12/2001 | Kocher et al. |
| 2002/0099948 A1 | 7/2002 | Kocher et al. |
| 2003/0028771 A1 | 2/2003 | Kocher et al. |
| 2003/0091185 A1* | 5/2003 | Swindlehurst et al. ......... 380/44 |
| 2004/0078588 A1 | 4/2004 | Chow et al. |
| 2007/0033419 A1 | 2/2007 | Kocher et al. |
| 2008/0037781 A1 | 2/2008 | Kocher et al. |
| 2008/0049935 A1 | 2/2008 | Kocher et al. |
| 2008/0101604 A1 | 5/2008 | Kocher et al. |
| 2008/0130886 A1 | 6/2008 | Kocher et al. |
| 2008/0133938 A1 | 6/2008 | Kocher et al. |
| 2008/0137848 A1 | 6/2008 | Kocher et al. |

OTHER PUBLICATIONS

Xilinx, Inc. "Virtex-5 FPGA Configuration User Guide", UG191 (v3.9.1) Aug. 20, 2010, Chapter 6, pp. 1-166, www.xilinx.com, Xilinx, Inc., 2100 Logic Drive, San Jose, CA, US.

* cited by examiner

METHOD AND INTEGRATED CIRCUIT FOR SECURE ENCRYPTION AND DECRYPTION

FIELD OF THE INVENTION

One or more embodiments generally relate to use of a substitution block in a cryptographic circuit.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that is programmable to implement a logic function. The function blocks of CPLDs, CLBs of FPGAs and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key to the structure that decrypts the design, and the key must be protected from unauthorized discovery A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is decrypting. During normal operation, the amount of power used by a device varies depending on the logic gates activated at a given time. By monitoring variations in the power consumption while the device is decrypting a configuration bitstream, for example, the attacker can identify operations that are performed and determine the decryption key.

One or more embodiments of the present invention may address one or more of the above issues.

SUMMARY

In one embodiment, a circuit arrangement for performing cryptographic operations is provided. The circuit may include a substitution block, a cryptographic circuit coupled to the substitution block, and a balancing circuit coupled to the substitution block. The substitution block may include a memory unit storing a substitution values and ones-complement values that are corresponding ones-complements of the substitution values. The substitution block, responsive to a request to read a specified one of the substitution values, may concurrently read and output the specified substitution value and the corresponding ones-complement value. A power consumed in reading the specified one of the substitution values is uniform with a power consumed in reading another one of the substitution values. The cryptographic circuit and the balancing circuit may be configured to concurrently operate on each substitution value and the corresponding one of the ones-complement values read from the memory, respectively.

In another embodiment, a method is provided for resisting power analysis during configuration of a programmable integrated circuit (IC). An encrypted bitstream may be input to the programmable IC. The encrypted bitstream may be decrypted with a decryption circuit. The decrypting of the encrypted bitstream may include concurrently reading a substitution value and a ones-complement of the substitution value from a substitution-box (S-BOX) memory. A power consumed when reading the substitution value may be uniform with a power consumed when reading another substitution value. A configuration memory of the programmable IC may be programmed with the decrypted bitstream.

In yet another embodiment, a programmable integrated circuit (IC) is provided. The programmable IC may include configuration memory, programmable resources coupled to the configuration memory, programmable interconnection resources coupled to the configuration memory and programmable resources, and a substitution block implemented in a block RAM (BRAM) memory unit coupled to the programmable interconnection resources. The substitution block may be configured to store a plurality of substitution values and ones-complement values that are corresponding ones-complements of the substitution values. In response to a request to read a specified one of the substitution values, the substitution block may be configured to concurrently read and output the specified substitution value and the corresponding one of the ones-complement values. A power consumed in reading the specified one of the substitution values is uniform with a power consumed in reading another one of the substitution values.

It will be appreciated that various other embodiments are set forth in the Detailed Description and Claims which follow.

BRIEF DESCRIPTION OF THE DRAWINGS

Various aspects and advantages of one or more embodiments of the invention will become apparent upon review of the following detailed description and upon reference to the drawings in which.

DETAILED DESCRIPTION OF THE DRAWINGS

During configuration of programmable logic, the configuration bitstream data can be intercepted and used to make unauthorized copies of the design. Although the configuration bitstream can be encrypted, the decryption key is vulnerable to discovery through power analysis. In a power analysis attack, current used by a device is monitored over time. During normal operation, the amount of power used by a device varies depending on the logic gates activated at a given time. By monitoring variations in the power consumption during decryption, the attacker can identify operations that are performed and determine the decryption key. One or more disclosed embodiments provide hardware-implemented countermeasures to improve resistance to power analysis attacks.

In an example involving DES encryption, sixteen rounds of encryption/decryption are performed on each block of data. Because similar operations are performed for each round, power consumption data can be identified for each round. Comparison of the power consumed in different rounds can identify key dependent operations and, ultimately, the key used for decryption. For example, the DES key schedule is produced by rotating 28-bit key registers. On a computer or microprocessor, the rotations are generally implemented using a right shift operation where a zero is shifted into the most significant bit by default. If the bit of the key shifted out of the register is a one, an additional operation is needed to cause the most significant bit to be equal to one. In logic, the rightmost bit must be routed back to the left side to be shifted in. The power consumption of that bit will likely be higher because of the increased capacitance on that routing. Therefore, a different power signature will be produced for each rotation depending on the bit of the decryption key. As used herein, a power signature may be referred to as power fluctuations, a power consumption signature, or a power consumption waveform, and such terms are used interchangeably herein. Other encryption ciphers, including both symmetric and asymmetric ciphers, also include key dependent operations that are susceptible to power analysis.

Random noise may be generated and added to modulate a power consumption waveform and conceal key dependent processes. However, even when the magnitude of the variations in power consumption are small in comparison to other power signals or noise, power variations of each operation can be detected and isolated using frequency filters and statistical analysis. This is known as differential power analysis (DPA). In DPA, a large number of samples are gathered by repeating encryption over a number of cycles. Samples gathered from each cycle are compared and analyzed to identify a common power signature among the repeated cycles from which the decryption can be identified. For example, added noise can be negated through statistical averaging. When random noise is evenly distributed, the noise will have little effect on the average of power consumption data from repeated rounds of decryption.

One class of cryptographic ciphers, known as a substitution ciphers, exchange the values of data blocks with pseudo random data blocks according to various selected mapping algorithms. Many cryptographic ciphers such as DES and AES perform substitution in conjunction with other cryptographic processes over several rounds of processing. Substitution is often performed using a lookup table that is stored in memory, where the input value indexes a substitution value in the table. The lookup table is known as a substitution table (S-BOX).

Use of an S-BOX may expose the decryption key to power analysis attacks. CMOS based memory cells exhibit dynamic power consumption that depends on the value being stored or read to and from the cells. When performing substitution lookups, an attacker may be able to analyze the power consumed during memory reads to determine bit values read from the memory, which may ultimately lead to uncovering of the decryption key.

One or more embodiments provide a method and circuit for implementing a cryptographic S-BOX that is resistant to differential power analysis. The S-BOX is implemented to perform read operations in a manner that consumes the same amount of power regardless of the value of the data being read. In addition to substitution data values, the ones-complement of each substitution value is also stored in the table. The S-BOX is configured to simultaneously read the S-BOX entry and the corresponding ones-complement value. The ones-complement value may also be referred to as the inverse value and such terms are used interchangeably herein. For each read of a memory cell storing the value of one, there is simultaneous read of a complementary memory cell storing the value of zero. In this manner, the same power signature is generated regardless of the input value or value being read. This is referred to as balanced power consumption.

For example, a hypothetical memory cell may draw 3 mA of current when reading a data bit set to the value of '1' and draw 1 mA of current when reading a data bit set to the value of '0'. Assuming equal distribution of values, the memory cell is expected to draw an average current of 2 mA. In the conventional S-BOX implementation, reading bits set to '1' would result in a current draw that is 1 mA higher than the mean and reading bits set to '0' would result in a current draw that is 1 mA lower than the mean. By configuring the S-BOX to read the ones-complement value concurrently with the substitution value, each read will consume 3 mA (2 mA+1 mA). Because each memory read consumes an equal amount of power, no power consumption information is leaked during substitution that is susceptible to differential power analysis. Those skilled in the art will recognize that, for example, due to minor imperfections introduced during die manufacture, there may be slight power variations in reading one pair of values versus another pair of values. However, such variations would not be indicative of the values read. Rather, the variations may be due to the locations from which the values were read or due to differences in propagation delay. Thus, when the terms "equal" or "uniform" are used herein in referring to levels of power consumption, those skilled in the art will recognized that the compared power levels are substantially equal or substantially uniform.

For ease of explanation, the following example embodiments and implementations are primarily described in terms of the Advance Encryption Standard (AES) cipher. One skilled in the art will recognize that the various embodiments are applicable to other cryptographic ciphers and implementations, which may be implemented to perform at least one cryptographic operation using lookup tables, such as DES, DES-3, Blowfish, Twofish, etc.

In the AES cipher, decryption of each data block is performed by repeating several cryptographic processes over a number of rounds. In each round of decryption, substitution is performed on each data byte using values stored in an S-BOX. After values have been substituted, permutation ciphers are applied to the substituted values to rearrange the order of the rows and columns of the data bytes according to two selected mapping algorithms. The output of each round is the exclusive-or (XOR) of the permuted value with the decryption key.

Table 1 shows the first 8 columns and rows of the conventional S-BOX used in the AES cipher, otherwise known as a Rijndael S-BOX. The values in Table 1 are shown in hexadecimal format.

TABLE 1

|   | 0  | 1  | 2  | 3  | 4  | 5  | 6  | 7  |
|---|----|----|----|----|----|----|----|----|
| 0 | 63 | 7C | 77 | 7B | F2 | 6B | 6F | C5 |
| 1 | CA | 82 | C9 | 7D | FA | 59 | 47 | F0 |
| 2 | B7 | FD | 93 | 26 | 36 | 3F | F7 | CC |
| 3 | 04 | C7 | 23 | C3 | 18 | 96 | 05 | 9A |
| 4 | 09 | 83 | 2C | 1A | 1B | 6E | 5A | A0 |
| 5 | 53 | D1 | 00 | ED | 20 | FC | B1 | 5B |
| 6 | D0 | EF | AA | FB | 43 | 4D | 33 | 85 |
| 7 | 51 | A3 | 40 | 8F | 92 | 9D | 38 | F5 |

The Rijndael S-BOX is derived by determining the multiplicative inverse of a number in the finite field $GF(2^8)$ and applying the following affine transformation:

$$\begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} \begin{bmatrix} x_0 \\ x_1 \\ x_2 \\ x_3 \\ x_4 \\ x_5 \\ x_7 \\ x_7 \end{bmatrix} + \begin{bmatrix} 1 \\ 1 \\ 0 \\ 0 \\ 0 \\ 1 \\ 1 \\ 0 \end{bmatrix}$$

where $[x_0, \ldots, x_7]$ is the multiplicative inverse as a vector. The AES cipher and calculation of the substitution table values are described in detail in Federal Inf. Process. Stds., *Advanced Encryption Standard (AES)*, NIST FIPS 197 (Nov. 26, 2001).

In one embodiment, each entry in the S-BOX includes a first part corresponding to a substitution value, and a second part corresponding to the ones-complement value. For example, in the context of an AES S-BOX, each entry may include a first byte storing the AES substitution value and a second byte storing the ones-complement of the AES substitution value. Table 2 shows an embodiment in which the substitution values from the S-BOX shown in Table 1 are paired with ones-complement values in an S-BOX.

TABLE 2

|   | 0    | 1    | 2    | 3    | 4    | 5    | 6    | 7    |
|---|------|------|------|------|------|------|------|------|
| 0 | 639C | 7C83 | 7788 | 7B84 | F20D | 6B94 | 6F90 | C53A |
| 1 | CA35 | 827D | C936 | 7D82 | FA05 | 59A6 | 47B8 | F00F |
| 2 | B748 | FD02 | 936C | 26D9 | 36C9 | 3FC0 | F708 | CC33 |
| 3 | 04FB | C738 | 23DC | C33C | 18E7 | 9669 | 05FA | 9A65 |
| 4 | 09F6 | 837C | 2CD3 | 1AE5 | 1BE4 | 6E91 | 5AA5 | A05F |
| 5 | 53AC | D12E | 00FF | ED12 | 20DF | FC03 | B14E | 5BA4 |
| 6 | D02F | EF10 | AA55 | FB04 | 43BC | 4DB2 | 33CC | 857A |
| 7 | 51AE | A35C | 40BF | 8F70 | 926D | 9D62 | 38C7 | F50A |

The substitution and ones-complement values may be stored and indexed in memory according to a number of different memory access schemes. In one example implementation the substitution and ones-complement values of the S-BOX are stored in adjacent memory locations that can be read using a single read request and are indexed by the same memory address. For example, if the substitution and ones-complement values are stored in adjacent bytes, both values may be read from memory by issuing a read request to read two bytes starting at the memory location for the first byte. The number of bytes required to be read concurrently depends on the number of bytes required for each value and their organization. In this two byte example, the memory may be configured to read memory blocks two bytes wide in order to ensure that the substitution and ones-complement values are retrieved from memory cells simultaneously.

In some implementations, the substitution and ones-complement values of each entry may be bit or byte interleaved to reduce the number of bytes needed to be accessed concurrently. For example, a cryptographic cipher may require substitution and ones-complement values that are each two bytes long. If these values are stored sequentially in a four byte block format (0xYYYYZZZZ), the four bytes need to be read concurrently to ensure that concurrent memory reads access Hamming-neutral data values. By storing the four bytes in an interleaved format (0xYYZZYYZZ), the entry may be retrieved in two sequential two-byte memory reads. One skilled in the art will recognize that the substitution and ones-complement values may be organized and stored in a number of different formats to fit the capabilities and requirements of the available circuitry. The method described herein may be used with any operation carried out by table lookup, including the AES operations of ShiftRows, MixColumns and AddRoundKey as well as concatenations of these operations.

The substitution and ones-complement values are not required to be stored in adjacent memory locations or retrieved with a single memory read operation. In one implementation, the substitution and ones-complement values may be stored in separate memory locations and retrieved using two simultaneous memory read requests. The memory read requests may be indexed by two separate addresses or a single memory address depending on how the corresponding S-BOX values are arranged in memory. For example, substitution values may be stored in a conventional S-BOX table format and stored in a 1024-byte block of memory. The ones-complement values may be stored in a table in the next 1024 bytes of memory. In this example, the ones-complement values can be indexed and retrieved using the corresponding substitution value addresses offset by 1024 bytes. When the substitution and ones-complement values of each S-BOX entry are stored in non-adjacent memory locations, the memory should be configured to process and retrieve values from two memory locations concurrently.

The above example implementations are described for illustrative purposes. One skilled in the art will recognize that substitution and ones-complement values may be organized and stored according to a number of other memory arrangements. The arrangement implemented may depend on a number of factors including table size, number of bits needed for each value, and type of memory used. In all implementations, the memory should be configured to concurrently retrieve substitution and ones-complement values or sub-values in a Hamming-neutral manner in order to generate a balanced power consumption during substitution.

Figure 1:
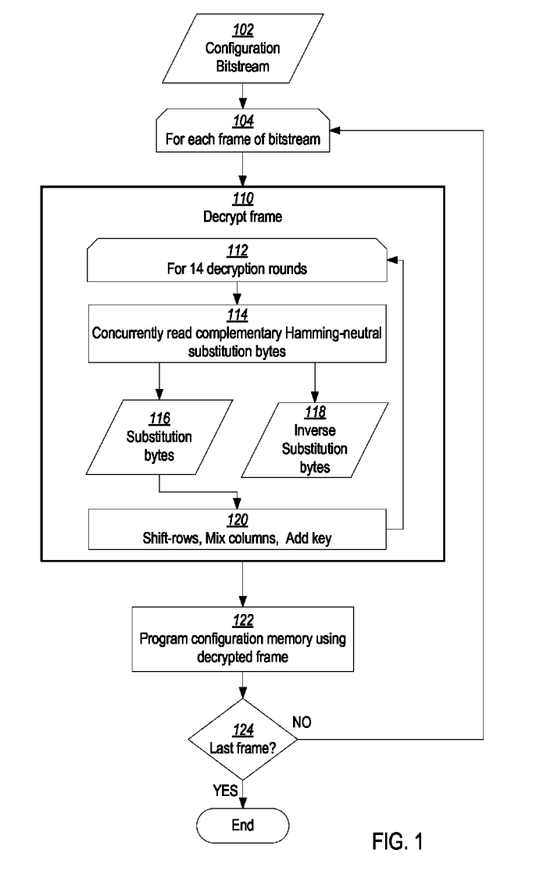
FIG. 1 shows a flowchart of an example process for configuration of programmable logic with an AES encrypted bitstream in accordance with one or more embodiments.

FIG. 1 shows a flowchart of an example process for configuration of programmable logic with an encrypted bitstream in accordance with one or more embodiments. An encrypted configuration bitstream 102 is received by a programmable IC. Each frame (block 104) of the encrypted configuration bitstream is decrypted at block 110. In this example, AES decryption is implemented. In AES, the decryption process 120 is repeated for fourteen rounds (block 112) for each frame of the encrypted bitstream, assuming a 256-bit key is used.

When decryption of a frame has completed, configuration memory of the programmable IC is programmed with the decrypted frame at block 122. The process is repeated at decision block 124 until all frames have been decrypted. During each round of decryption 112, input data values are substituted at block 114. The substitution step concurrently reads substitution bytes 116 and ones-complement bytes of the substitution bytes 118 (the ones-complement bytes are represented in FIG. 1 by the "inverse substitution bytes 118"). The concurrent reading of data is said to be Hamming-neutral because an equal number of one and zero bits are read from memory at the same time. In this manner, memory reads performed during substitution block 114 use the same amount of current regardless of the bit-values in the substitution data.

After substitution is completed in each round, additional cryptographic operations are performed using the substitution data bytes 116. In this example, rows are shifted, columns are mixed, and a cryptographic key is added in block 120 using the substitution bytes 116.

In the example shown in FIG. 1, the ones-complement value is discarded in each round after substitution is completed. In a number of embodiments, the ones-complement value may be used to balance the power consumed by the additional cryptographic operations performed in block 120. This may be accomplished by driving a current load with the ones-complement values which consumes an amount of power that balances the power consumed by the cryptographic operations. The load driven by the ones-complement value may be referred to as a termination circuit or a balancing circuit and such terms are used interchangeably herein.

Figure 2:
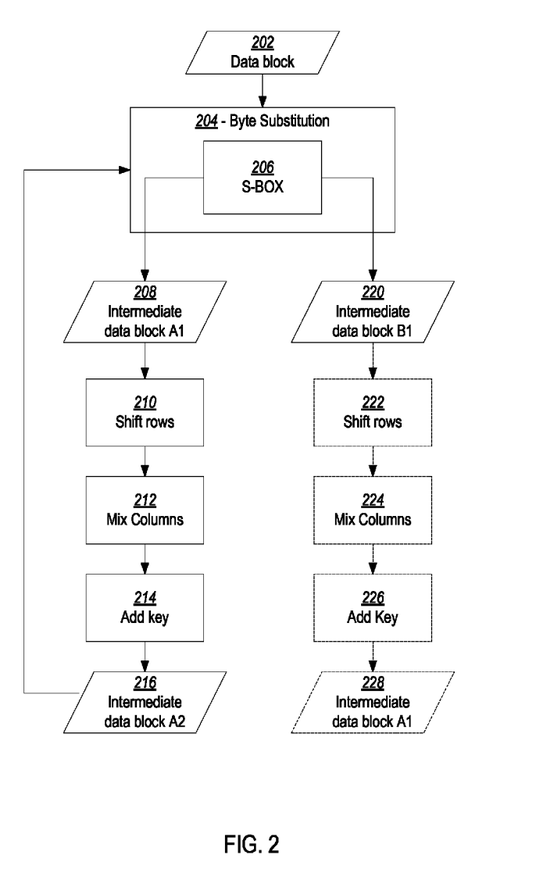
FIG. 2 shows a flowchart of an example AES decryption process using an S-BOX and balancing circuitry in accordance with one or more embodiments.

FIG. 2 shows a flowchart of an example AES decryption process using an S-BOX and termination circuits to balance the power consumption of the AES processes. In each round of decryption, byte substitution is performed at block 204 on input data blocks 202. Substitution is performed at block 204 by retrieving a substitution value (represented by "intermediate data block A1 208" in FIG. 2) corresponding to the data block 202, from an S-BOX table 206 stored in memory. In accordance with one or more embodiments, a ones-complement value (represented by "intermediate data block B1 220" in FIG. 2) is read from memory concurrently with the substitution value. Following substitution, rows are shifted at block 210, columns are mixed at block 212, and a cryptographic key is added to the result, typically with an XOR operation, at block 214. In this example, current consuming operations are performed using the ones-complement value, to balance the one or more of the cryptographic operations performed in blocks 210, 212, and 214.

In one embodiment, the power consumption of the cryptographic operations may be balanced by concurrently processing the ones-complement data with redundant cryptographic circuits. For example, row-shift operations 210 and 222 may be respectively performed using first and second cryptographic circuits configured to perform row-shift operations. For each bit processed by one of the first and second circuits, the inverse value will be processed by the other of the first and second circuits. In this manner power consumption of the row-shift operations are balanced. The power consumed by the AES cipher may be further balanced by implementing redundant circuits to perform processes of column-mixing 224 and adding key 226 using the output of the complementary row-shift operation 222. The ultimate data value resulting from the sum of implemented balancing operations (represented by "intermediate data value A1 228" in FIG. 2) may be discarded once balancing operations have completed.

In another embodiment, the power consumed by one or more of the cryptographic operations may be balanced with an input-dependent current load that is selected to approximate the power consumption of a cryptographic operation that is to be balanced. For example, one cryptographic operation may draw an additional 10 mA of current when a bit set to one is input than when a bit set to zero is input. The balancing circuit may be configured to have a current load that is 10 mA larger when an input bit is set to one. If the balancing circuit is driven by the ones-complement of the value that is input to the cryptographic operation, the balancing circuit will cancel out the 10 mA difference in processing high and low input bits. In some embodiments, the balancing circuit comprises the routing path of the signal wires carrying the ones-complement of the value, so that the loading of signals 116 is the same as the loading on signals of 118. One skilled in the art will recognize that a number of other current load schemes may be selected to balance the power consumed by the cryptographic operations.

In many real-world implementations, the balancing circuitry may be unable to completely balance the power consumed by the cryptographic operations. For example, a hypothetical processing circuit may draw 12 mA of current when a bit set to one is input but only 2 mA when a bit set to zero is input. A hypothetical balancing may draw 11.9 mA of current when a bit set to one is input, and 2 mA when a bit set to zero is input. Table 3 shows the current draw of the example cryptographic and balance circuits. The cryptographic circuit receives substitution value x as input and the balance circuit receives the ones-complement value, x*. The cryptographic circuit produces a current difference of 10 mA when processing different input bits. The balancing circuit produces a current draw difference of 9.9 mA when processing the different ones-complement bits x*. When operated in lockstep, the two circuits consume a cumulative 13.9 mA when input x=0 and 14 mA when input x=1.

TABLE 3

|  | Cryptographic_circuit(x) | Balance_circuit(x*) | Crypto & Balance circuits |
| --- | --- | --- | --- |
| Input x = 0 | 2 mA | 11.9 mA | 13.9 mA |
| Input x = 1 | 12 mA | 2 mA | 14 mA |
| Difference | 10 mA | 9.9 mA | 0.1 mA |

As a result, the balancing circuitry compensates for 99 percent of the 10 mA difference consumed by the cryptographic circuit to produce a substantially uniform level of power consumption but not completely eliminate all detectable power consumption. In an FPGA implementation, the difference in power may be reduced to less than 0.01%.

This imbalance of power consumed may result from a number of different causes. For example, in the circuit shown in FIG. 4, the signal path from the cryptographic controller 404 to cryptographic ALU 408 may be longer than the path to cryptographic ALU 410. As a result, the cryptographic operations performed by the ALUs will be executed at slightly different times in which the power consumed by the ALUs will not be perfectly balanced. Slight imbalance may also occur when the balancing circuit is not an exact duplicate of the cryptographic circuit.

To obscure any remaining imbalance, in one embodiment, balancing circuitry may be configured to vary the current load that is driven by the ones-complement values according to a plurality of power consumption approximation models. The balancing circuitry can be configured to periodically modify the load applied by the balancing circuit for each input value. As a result, the amount of imbalance between the cryptographic circuit and balancing circuit changes over time. This makes it harder to extract information from the remaining detectable power consumption.

The load of the balancing circuit may be changed periodically or on a pseudo-random basis. Furthermore, the load may be varied based on a pseudo-random value or according to a selected pattern.

In another embodiment, one or more of the additional cryptographic operations may be performed using S-BOX look up tables implemented as discussed above. For example, a second S-BOX table may be constructed to contain corresponding post row-shift values that are indexed by the pre row-shift values. By performing these operations using complementary S-BOX memory reads, power consumed by these operations can be balanced.

Figure 3:
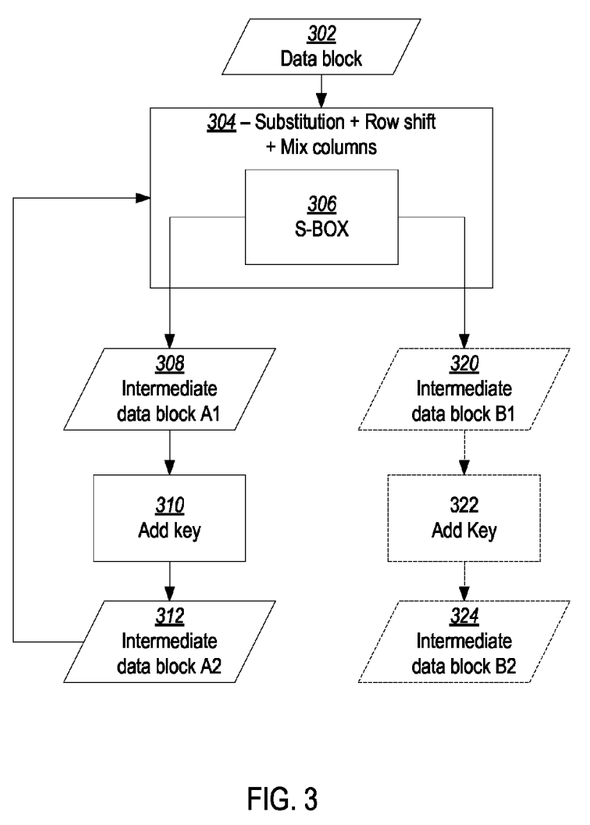
FIG. 3 shows a flowchart of an example AES decryption process using S-BOXes to perform substitution and one or more additional cryptographic processes in accordance with one or more embodiments.

FIG. 3 shows a flowchart of an example AES decryption process using S-BOXes to perform one or more additional cryptographic processes. In this example, AES substitution, row-shift, and column-mix operations are performed using a series of S-BOX lookup tables as shown by block 304. As discussed above, balancing operations for each S-BOX lookup are performed by concurrently reading an entry of the S-BOX table and its ones-complement value. In this example, the retrieved value from the last S-BOX 306 is output and this value is represented by intermediate data block A1 308. The key is added to intermediate data block A1 308 at add key block 310 to complete the round of decryption. As discussed above, the ones-complement output from the last S-BOX (represented as "intermediate data block B1 320") may be used to balance operations performed in add key block 310. The balancing operations performed in add key block 322 ensure that a uniform amount of power is used during the add key block 310. In this example, the result (represented by "intermediate data block A2 312") output from the add key block 310 is used to perform the next round of decryption. The result (represented by "intermediate data block B2 324") output from add key block 322 may be discarded.

Figure 4:
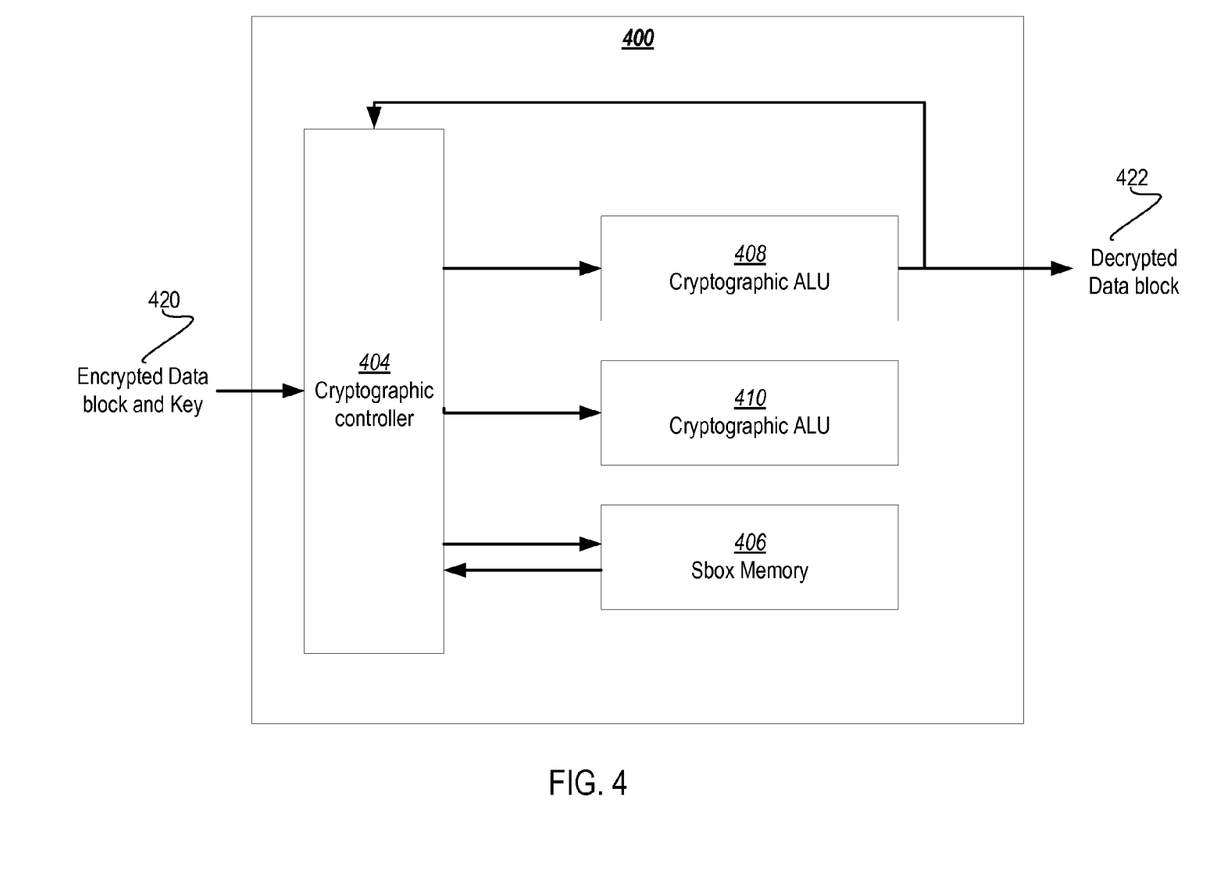
FIG. 4 shows a block diagram of an example decryption circuit configured in accordance with one or more embodiments.

FIG. 4 shows a block diagram of an example decryption circuit 400 configured in accordance with one embodiment. In this example circuit implementation, encrypted data block values and a cryptographic key 420 are received by cryptographic controller 404. In each round of decryption, substitution is performed by retrieving corresponding substitution and ones-complement values from S-BOX memory 406. The cryptographic controller is configured to output the substitution value to cryptographic arithmetic logic unit (ALU) 408 and the ones-complement value to cryptographic ALU 410. The ALUs 408 and 410 perform one or more cryptographic operations and output the respective results. The output of cryptographic ALU 408 is input back into to cryptographic controller 404 to perform the next round of decryption. The output of cryptographic ALU 410 may be discarded. When all rounds of decryption have completed, decrypted data block 422 is output.

Figure 5:
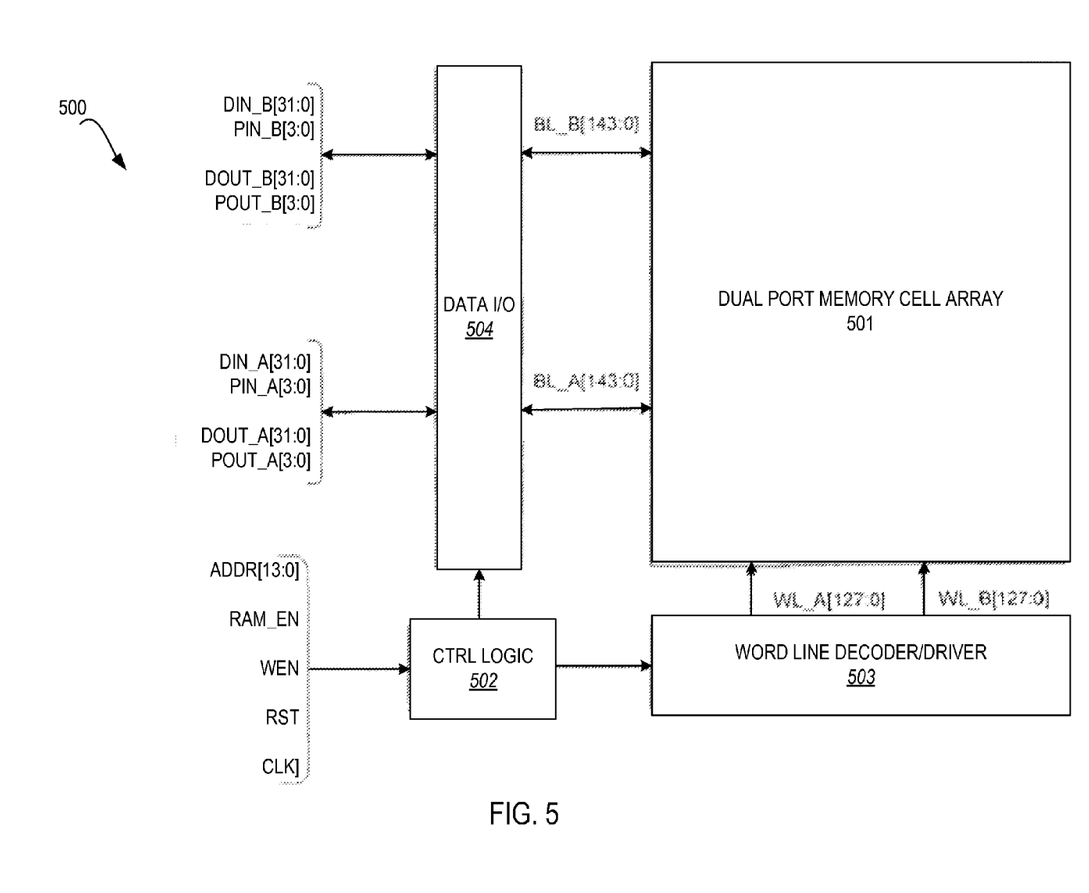
FIG. 5 shows an example dual port memory that may be used to implement a substitution box in accordance with one or more embodiments.

FIG. 5 shows an example dual port memory that may be used to concurrently retrieve substitution and ones-complement S-BOX values in accordance with various embodiments. Block RAM (BRAM) 500 includes a dual-port memory cell array 501, control logic 502, word line decoder/driver circuit 503, and data input/output (I/O) circuit 504. Control logic 502 is coupled to receive the input signals ADDR[13:0], RAM_EN, WEN, RST and CLK. In this example, the input ADDR indexes a substitution value that is output on a first port DOUT_A, as well as the ones-complement of the substitution value, which is output on a second port DOUTB.

First port word lines WL_A[127:0] and second port word lines WL_B[127:0] run vertically through memory cell array 501. The word lines WL_A[127:0] and WL_B[127:0] are controlled by word line decoder/driver 503. First port bit-line pairs BL_A[143:0] and second port bit-line pairs BL_B[143:0] run horizontally through memory cell array 501. Bit-line pairs BL_A[143:0] and BL_B[143:0] are coupled to data I/O circuit 504 as illustrated. Data I/O circuit 504 routes the input data values DIN_A[31:0], PIN_A[3:0], DIN_B[31:0] and PIN_B[3:0] to memory cell array 501, and routes the output data values DOUTA[31:0], POUT_A[3:0], DOUT_B[31:0] and POUT_B[3:0] from memory cell array 501 under the control of control logic 502.

In this example, the control logic indexes each substitution value and corresponding ones-complement value with a single memory address. The BRAM memory 500 is configured to read and output values from both addresses in parallel. In other implementations, the memory may be configured to index the substitution and ones-complement values using separate addresses.

Figure 6:
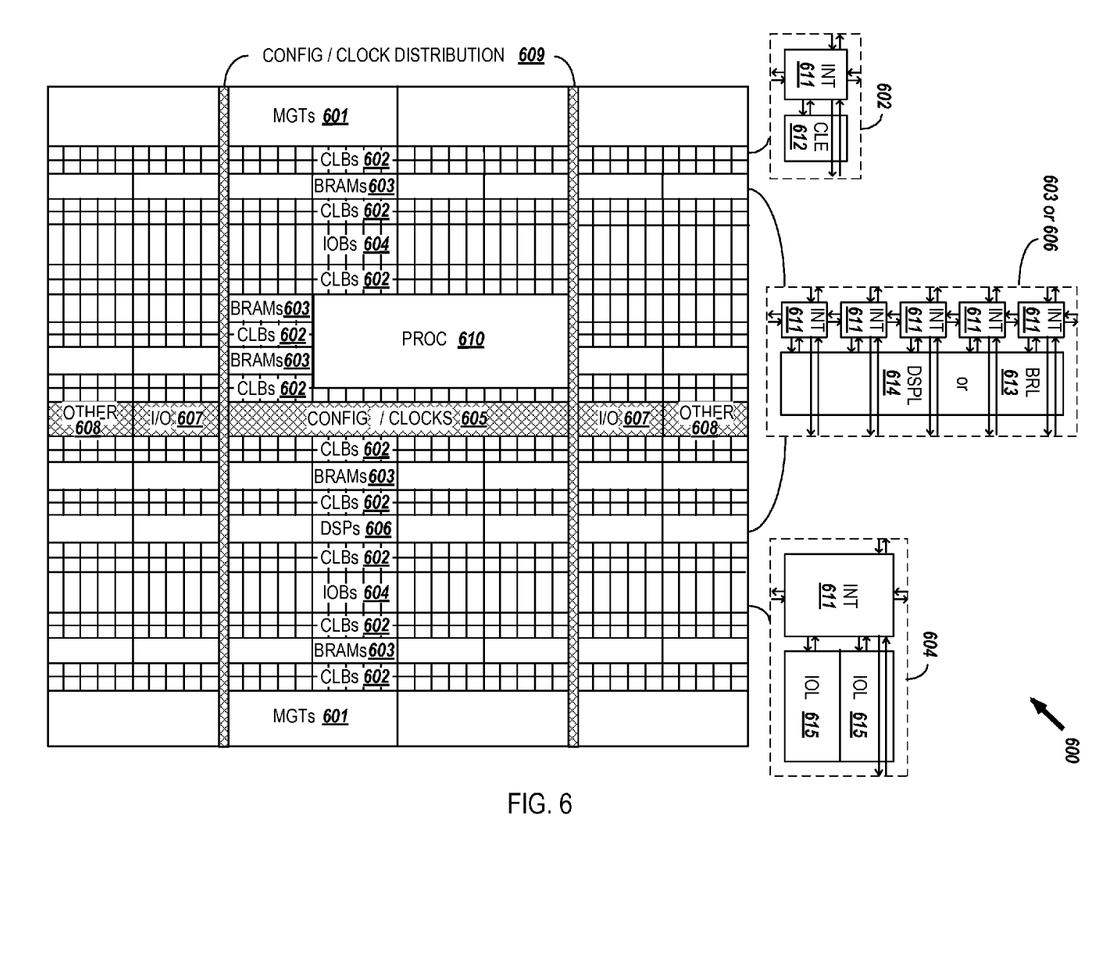
FIG. 6 shows an example programmable logic IC which may be configured to implement decryption in accordance with one or more embodiments.

FIG. 6 is a block diagram of an example field programmable gate array (FPGA) which may be configured to implement decryption in accordance with one or more embodiments. FPGAs can include several different types of programmable logic blocks in the array. For example, FIG. 6 illustrates an FPGA architecture (600) that includes a large number of different programmable tiles including multi-gigabit transceivers (MGTs 601), configurable logic blocks (CLBs 602), random access memory blocks (BRAMs 603), input/output blocks (IOBs 604), configuration and clocking logic (CONFIG/CLOCKS 605), digital signal processing blocks (DSPs 606), specialized input/output blocks (I/O 607), for example, clock ports, and other programmable logic 608 such as digital clock managers, analog-to-digital converters, system monitoring logic, and so forth. Some FPGAs also include dedicated processor blocks (PROC 610). In some FPGAs, each programmable tile includes a programmable interconnect element (INT 611) having standardized connections to and from a corresponding interconnect element in each adjacent tile. Therefore, the programmable interconnect elements taken together implement the programmable interconnect structure for the illustrated FPGA. The programmable interconnect element INT 611 also includes the connections to and from the programmable logic element within the same tile, as shown by the examples included at the top of FIG. 6.

For example, a CLB 602 can include a programmable resource such as, e.g., a configurable logic element (CLE) 612 that can be programmed to implement user logic plus a single programmable interconnect element INT 611. A BRAM 603 can include a BRAM logic element (BRL 613) in addition to one or more programmable interconnect elements. The BRAMs are configurable in depth and width and configurable to perform reads and writes from a number of different ports of the same or different port widths. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL 614) in addition to an appropriate number of programmable interconnect elements. An IOB 604 can include, for example, two instances of an input/output logic element (IOL 615) in addition to one instance of the programmable interconnect element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual FPGA more than one adjacent column of CLBs is typically included wherever the CLBs appear, to facilitate the efficient implementation of user logic.

One or more disclosed embodiments are believed to be applicable to a variety of systems for encryption and decryption. The embodiments may be used alone or in combination with other DPA mitigation techniques such as random noise generation, signal to noise reduction, random signal path delays, and/or clock skipping. Other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit arrangement, comprising:
   a substitution block including a memory unit storing a plurality of substitution values and a plurality of ones-complement values that are corresponding ones-complements of the plurality of substitution values, wherein the substitution block, responsive to a request to read a specified one of the plurality of substitution values, concurrently reads and outputs the specified substitution value and the corresponding ones-complement value, and a power consumed in reading the specified one of the plurality of substitution values is uniform with a power consumed in reading another one of the plurality of substitution values;
   a cryptographic circuit coupled to the substitution block;
   a balancing circuit coupled to the substitution block; and
   wherein the cryptographic circuit and the balancing circuit are configured to concurrently operate on each of the plurality of substitution values and the corresponding one of the plurality of ones-complement values read from the memory unit, respectively;
   wherein power consumed together by the cryptographic circuit and the balancing circuit in the concurrent operation on the plurality of substitution values and the corresponding ones-complement values is uniform;
   wherein the balancing circuit is configured to obscure a current load imbalance between the cryptographic circuit and the balancing circuit by varying a current load that is driven by the balancing circuit; and
   wherein the balancing circuit is configured to vary the current load that is driven by ones-complement values according to a plurality of power consumption approximation models.

2. The circuit arrangement of claim 1, wherein the balancing circuit includes a circuit identical to the cryptographic circuit.

3. The circuit arrangement of claim 1, wherein the balancing circuit includes an active circuit element driven by the corresponding ones-complement value output from the substitution block, and the balancing circuit is configured to generate a first power consumption signature similar to a second power consumption signature generated by the cryptographic circuit when driven by the corresponding one of the plurality of ones-complement values.

4. The circuit arrangement of claim 1, wherein each of the plurality of substitution values and the corresponding one of the plurality of ones-complement values are stored in adjacent sets of bits.

5. The circuit arrangement of claim 1, wherein each of the plurality of substitution values and corresponding one of the plurality of ones-complement values are indexed by a same address in the memory unit.

6. The circuit arrangement of claim 1, wherein each of the plurality of substitution values read from the memory unit corresponds to a value resulting from Advanced Encryption Standard (AES) substitution, row-shifting, and column mixing operations.

7. The circuit arrangement of claim 1, wherein the memory unit is a dual port memory unit having first and second data ports, the specified substitution value is output on the first port, and the corresponding ones-complement value is output on the second port in parallel with output of the specified substitution value on the first port.

8. The circuit arrangement of claim 1, wherein each substitution value is bit-interleaved with the corresponding ones-complement value in the memory unit.

9. The circuit arrangement of claim 1, wherein each substitution value is byte-interleaved with the corresponding ones-complement value in the memory unit.

10. A method for resisting power analysis during configuration of a programmable integrated circuit (IC), comprising:
    inputting an encrypted bitstream to the programmable IC;
    decrypting the encrypted bitstream, wherein the decrypting includes:
      concurrently reading a substitution value and a ones-complement of the substitution value from a substitution-box (S-BOX) memory, wherein a power consumed when reading the substitution value is uniform with a power consumed when reading another substitution value;
      performing one or more cryptographic operations with a decryption circuit using the substitution value; and
      concurrently with the performing one or more cryptographic operations, performing one or more power consuming operations with a balancing circuit using the ones-complement of the substitution value;
    wherein power consumed together by the decryption circuit and the balancing circuit is uniform across the concurrent operations on substitution values and corresponding ones-complement values read from the S-BOX memory;
    adjusting a current load that is driven by the balancing circuit operating on the ones-complement values to obscure a current load imbalance between the decryption circuit and the balancing circuit;

configuring the balancing circuit to vary the current load that is driven by ones-complement values according to a plurality of power consumption approximation models; and programming configuration memory of the programmable IC with the decrypted bitstream.

11. The method of claim 10, wherein at least one of the one or more cryptographic operations is performed using a look-up table.

12. The method of claim 10, wherein the one or more cryptographic operations includes Advanced Encryption Standard (AES) row-shifting, and column mixing operations.

13. The method of claim 10, wherein the performing one or more power consuming operations using the ones-complement of the substitution value consumes an amount of power equivalent to an amount of power that is consumed when performing the one or more cryptographic operations using the ones complement value.

14. The method of claim 10, further comprising:
generating a pseudo random number; and
wherein the adjusting an amount of power consumed in the one or more power consuming operations includes adjusting the amount of power consumed in the one or more power consuming operations by an amount dependent on the pseudo-random number.

15. A programmable integrated circuit (IC) comprising:
configuration memory;
programmable resources coupled to the configuration memory;
programmable interconnection resources coupled to the configuration memory and the programmable resources; and
a substitution block implemented in a block random access memory (BRAM) unit coupled to the programmable interconnection resources and configured to:
store a plurality of substitution values and a plurality of ones-complement values that are corresponding ones-complements of the plurality of substitution values; and
responsive to a request to read a specified one of the plurality of substitution values, concurrently read and output the specified substitution value and a corresponding one of the plurality of ones-complement values, wherein a power consumed in reading the specified one of the plurality of substitution values is uniform with a power consumed in reading another one of the plurality of substitution values;
a cryptographic circuit coupled to the substitution block;
a balancing circuit coupled to the substitution block; and
wherein:
the cryptographic circuit and the balancing circuit are configured to concurrently operate on each of the plurality of substitution values and the corresponding one of the plurality of ones-complement values read from the memory unit, respectively, and power consumed together by the cryptographic circuit and the balancing circuit in the concurrent operation on the plurality of substitution values and the corresponding ones-complement values is uniform;
the balancing circuit is configured to consume an amount of power dependent on the corresponding one of the plurality of ones-complement values and to obscure a current load imbalance between the cryptographic circuit and the balancing circuit by varying a current load that is driven by the balancing circuit; and
wherein the balancing circuit is configured to vary the current load that is driven by ones-complement values according to a plurality of power consumption approximation models.

16. The programmable IC of claim 15, further comprising:
a configuration controller coupled to the configuration memory, substitution block, and cryptographic circuit, the configuration controller configured to:
decrypt input configuration data using the substitution block and cryptographic circuit; and
program the configuration memory with the decrypted input configuration data.

17. The programmable IC of claim 15, wherein the BRAM is configurable to store and output data values in two or more data block sizes.

18. The programmable IC of claim 15, wherein each substitution value is bit-interleaved with the corresponding ones-complement value in the memory unit.

19. The programmable IC of claim 15, wherein each substitution value is byte-interleaved with the corresponding ones-complement value in the memory unit.

* * * * *